Oct. 19, 1926.

V. MULHOLLAND ET AL 1,603,974

APPARATUS FOR CONDITIONING MOLTEN GLASS

Filed Oct. 16, 1919     3 Sheets-Sheet 1

Witness
E. Jarvis

Inventors
Vergil Mulholland
Karl E. Peiler
by Wm H Honiss
Atty.

Patented Oct. 19, 1926.

1,603,974

UNITED STATES PATENT OFFICE.

VERGIL MULHOLLAND AND KARL E. PEILER, OF WEST HARTFORD, CONNECTICUT, ASSIGNORS TO HARTFORD-EMPIRE COMPANY, OF HARTFORD, CONNECTICUT, A CORPORATION OF DELAWARE.

APPARATUS FOR CONDITIONING MOLTEN GLASS.

Application filed October 16, 1919. Serial No. 331,237.

The invention relates to a method of and apparatus for conditioning molten glass prior to and during its segregation into gathers or separation into mold charges.

In obtaining gathers or charges of molten glass from the furnace or melting tank by some methods now in use, it has been the practice to condition by heat treatment the glass adjacent and beneath the discharge outlet to avoid the loss of heat from the glass, and maintain it at the proper working temperature. Loss of heat from the glass during its segregation from the main body in the container may be caused by contact with the outlet or by contact with the colder surrounding atmosphere, or by chilling due to contact with the shear blades by which the glass is separated into mold charges, and many other causes.

Several ways of conditioning the glass have been suggested, one being the application of flame or hot gases directly to the glass to control and vary its thermal and physical conditions according to the character of the article to be produced. This method of heating is uncertain and unreliable to a certain extent in that it is difficult to maintain the proper temperature, and to apply the required amount of heat to the desired portion or part of the glass without unduly heating other portions of the glass. Furthermore, air and particles of carbon and foreign matter are liable to be entrained in the glass, producing undesirable marks and blemishes in the finished article.

Another practice has been to heat the glass by conduction, the refractory walls in contact with the glass being heated extraneously, so that the flame or products of combustion do not contact with or impinge upon the glass. Even when a substantially uniform temperature of the glass, while in contact with the walls, can be obtained by this method, the suspended forming gather or the suspended stub of glass left by the separation or severing of mold charges from the glass cannot readily be kept hot or reheated. Furthermore, the refractory walls are quickly eroded under these conditions, necessitating an extended interruption of production for replacement or repairs.

A compromise method, combining the heating of the glass in contact with the walls by conduction, and the application of flame to the suspended gather and stub of the issuing glass has also been proposed, but this method involves practically all of the deficiencies of the heating by conduction and the heating by the application of flame, above referred to.

The present invention seeks to overcome these difficulties by treating and conditioning the molten glass prior to and during its delivery from a source of supply, by radiant heat, or in other words by heat radiated from a suitable agency out of contact with the glass, maintaining about the glass prior to and during its delivery a heated envelope of the desired temperature which may be greater, equal to or less then the glass itself.

To accomplish this, the molten glass is caused to pass from a melting tank or furnace into a forehearth or container provided with an outlet for the discharge of the glass. The forehearth is covered, and its outlet is substantially enclosed by a chamber, the walls of which are composed of refractory and heat retaining material. The position of these walls, with respect to the glass in the forehearth and adjacent and below the outlet, is such that they surround, but do not contact with the glass. Heat from any suitable source, preferably oil or gas burners, is directed toward and circulated about the chamber walls in such a manner that those walls are highly heated. These walls being out of contact with the glass in the forehearth and at and under the outlet, and having absorbed and conducted the heat from the flames and products of combustion, radiate and reflect the heat to the glass.

Regulation and variation of the temperature conditions within the chamber are provided for in such a manner that the glass in the forehearth and at and under the outlet may be reheated, maintained at a constant temperature, or allowed to cool slightly, as conditions, or the character of the finished article, may require. By a proper regulation of the temperature and draft conditions within the chamber, a quiescent condition about the discharging glass may be maintained.

Means may be provided for governing and controlling the discharge of glass from the outlet, and the formation of gathers or mold charges contiguous thereto.

Severing mechanism operating in timed relation to the gather forming means are utilized for separating the mold charges from the gathers when formed.

To save time and to assist in more rapidly heating the outlet of the forehearth and glass adjacent thereto, when beginning operations, auxiliary heating means are provided and so positioned as to direct a heating flame toward the outlet, so that the glass will readily flow therethrough. This auxiliary heating means is shut off after the outlet and the glass adjacent thereto has been sufficiently heated and the discharge of glass is assured.

Externally disposed air jets may be employed at any necessary openings to oppose the issuance of flames or gases therefrom, thus maintaining a desired balance of draft conditions within the chamber.

Referring to the drawings:—

Figure 1:
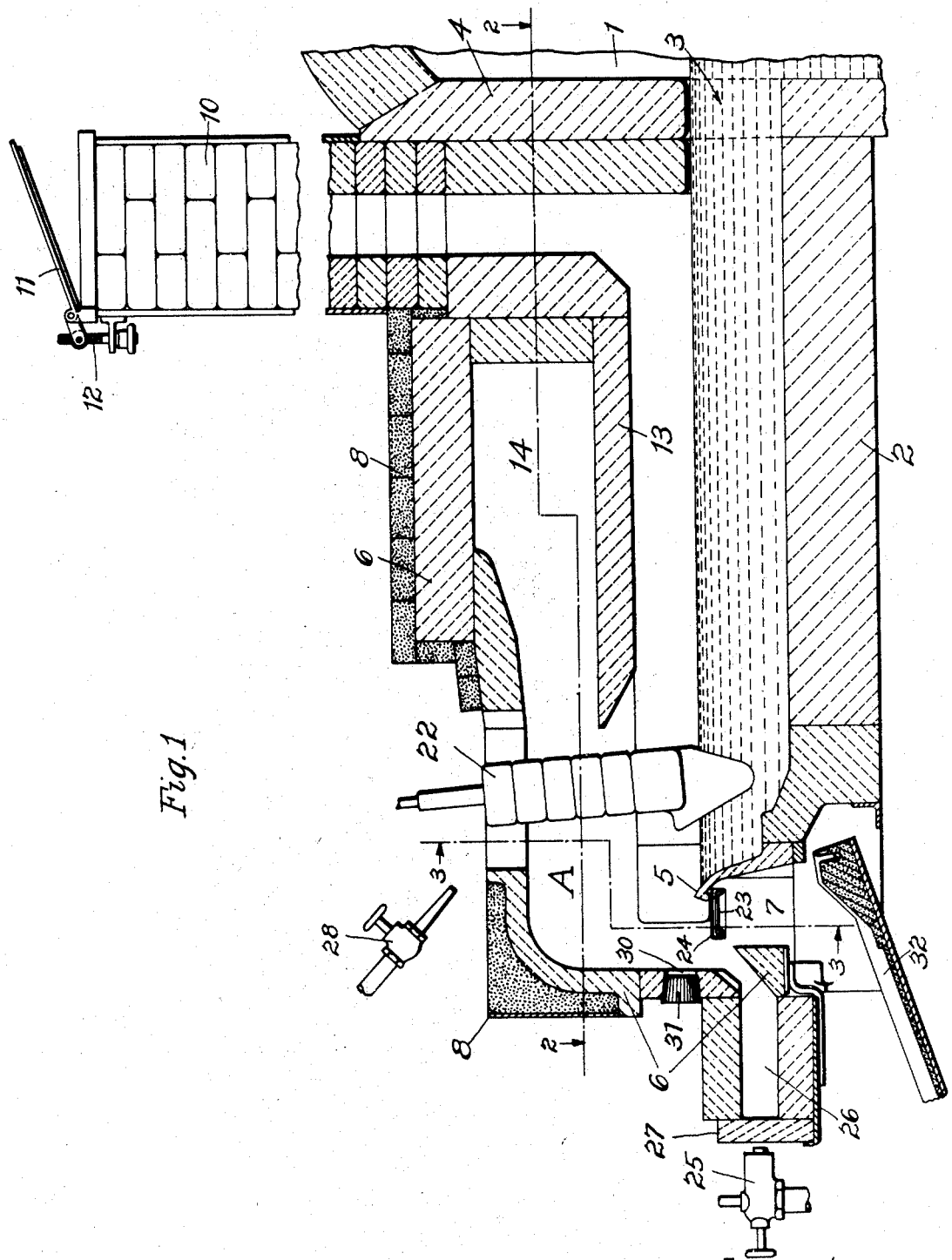
Fig. 1 is a longitudinal section through the conditioning chamber, illustrating its association with a glass furnace, or reservoir.
Figure 2:
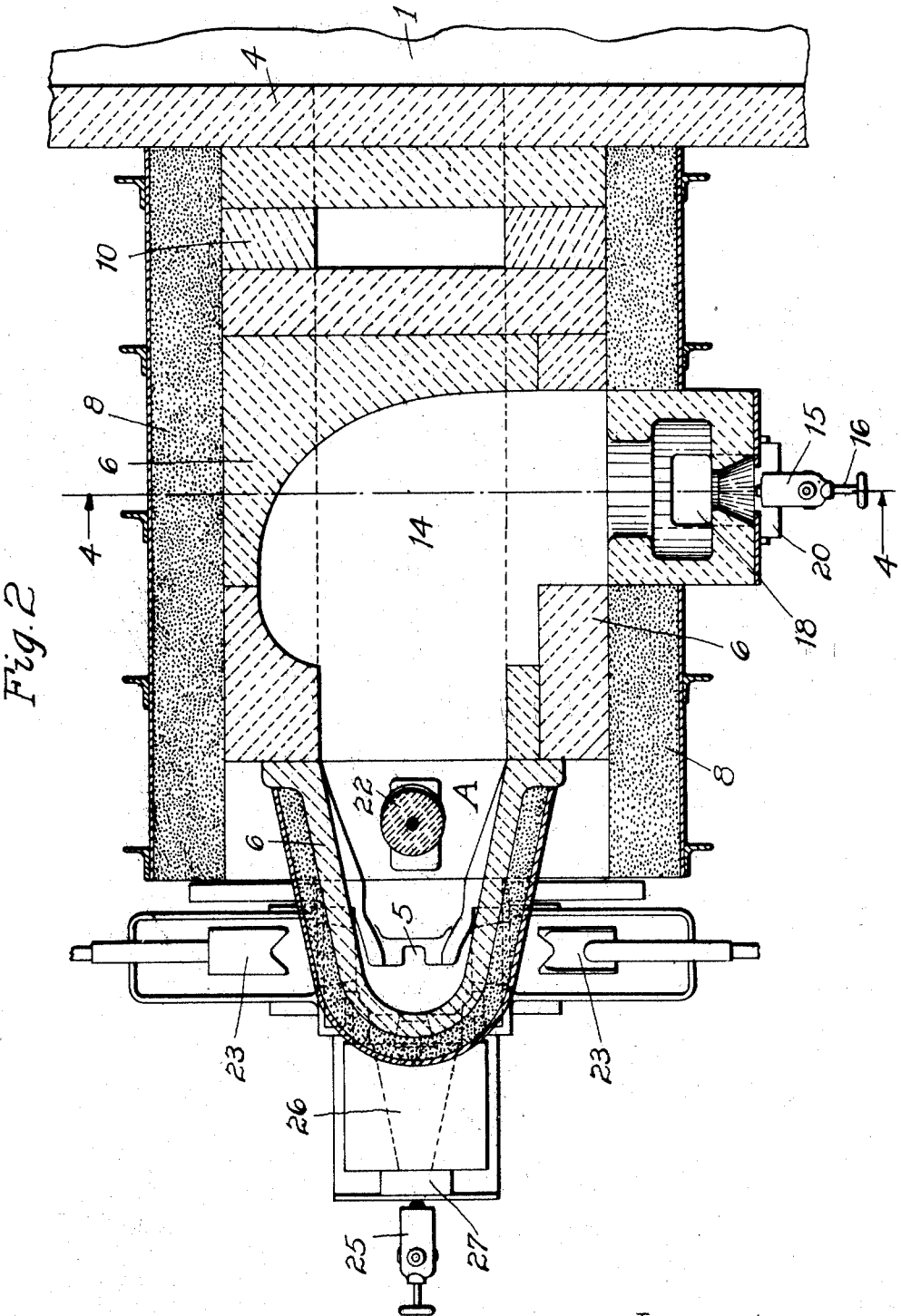
Fig. 2 is a horizontal section on the line 2—2 of Fig. 1.
Figure 3:
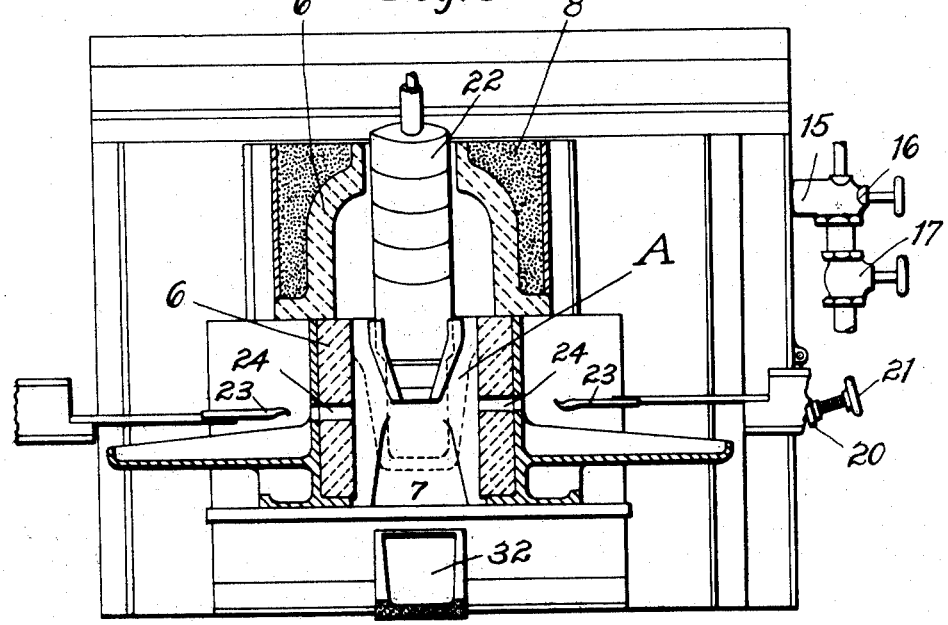
Fig. 3 is a transverse section on the line 3—3 of Fig. 1.
Figure 4:
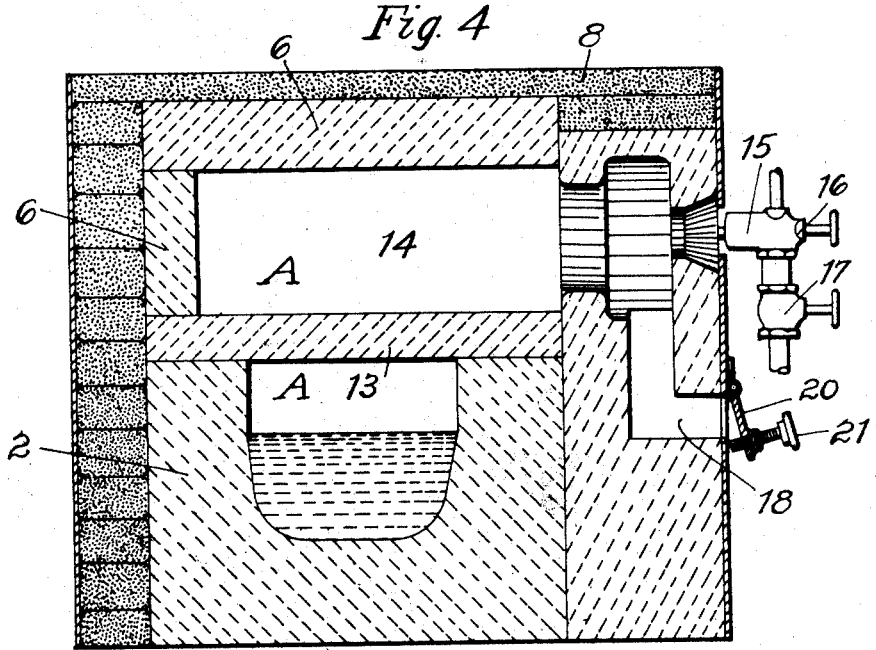
Fig. 4 is a transverse section on the line 4—4 of Fig. 2.

A glass furnace or reservoir 1 is provided with a forehearth or container 2, an opening 3 being formed in the wall 4 of the furnace for the admission of glass from the furnace to the forehearth. The forehearth or container 2 is provided with an outlet 5. The outlet 5 may be so formed as to provide for a gravity flow, or a discharge under the influence of a controlling device, an example of which is herewith described.

The forehearth 2 is covered by a hood 6 which surrounds and projects below the outlet, an opening 7 being provided below the outlet 5 for the delivery or passage of the glass from the outlet. The location and position of the walls of the hood 6 are such that they surround, but do not contact with, the glass in the forehearth and the glass at and below the outlet. Thus the walls of the hood 6 form the substantially enclosed chamber A around the forehearth 2 and around and under its outlet 5 in which the glass is conditioned as hereinafter described. Escape of heat from the walls of the chamber may be minimized by suitable insulating material 8.

A stack 10 communicating with the chamber A is erected adjacent the wall 4 of the glass furnace, and at the rear of the chamber A, to permit the escape of the products of combustion. The stack 10 and wall 4 of the furnace separate the chamber from the furnace, the only communication between them being the opening 3 for the passage of the glass. If other openings connecting the chamber and the furnace are desired, they should be of such a character as not to disturb or influence the heat or draft conditions in the chamber A. The stack 10 is provided with a damper 11 which may be adjusted to any desired position by the screw 12 or other suitable means.

Located between the surface of the glass in the forehearth 2 and the top wall of the hood 6 is a baffle 13, which projects forwardly from the stack 10 and toward the outlet. This baffle, together with the walls of the hood 6, forms a combustion space 14, which is fired, preferably from the side, by oil or gas burners 15, or other suitable heating means. These burners are capable of variable regulation by means of valves 16 and 17, so that by proper adjustments the heat in the chamber may be varied at will, and controlled independently of the temperature conditions in the furnace. An auxiliary air port 18 may be provided for the admission of air to assist the combustion, and this port is controlled by a gate 20 regulated by means of the screw 21.

The location and position of the combustion space 14 is such that when proper adjustments of the burner 15, gate 20, and damper 11 are made, the flames, gases, or products of combustion in the combustion chamber 14 move forwardly and then downwardly past the end of the baffle 13, and rearwardly along the under surface of the baffle and up through the stack. Heat is thus imparted to and absorbed by the walls of the chamber A and the baffle 13, which in turn heat the glass in the forehearth by radiation and reflection. The front and side walls of the chamber, which surround and project below the outlet 5, absorb, conduct and reflect the heat from the walls adjacent the path of travel of the flames, gases, and products of combustion, and radiate heat to the glass being delivered from the forehearth or container 2.

Variation of the heat condition in the chamber A may be effected by proper adjustments of the burner valves 16 and 17, gate 20 and stack damper 11.

By means of the fuel valve 16 and the air valve 17, the amount of oil and air admitted to the burner may be regulated, so that the temperature in the combustion chamber is under control. By adjusting the air gate 20, the amount of auxiliary air for combustion or for dilution of the fire may also be regulated. By supplying less air through the burner air valve 17 and more air through the air port 18, a longer flame will be obtained. On the other hand the burner air valve 17 may be opened sufficiently to produce complete combustion or a short flame in the combustion space.

By lowering the stack damper 11, the draft is decreased and the products of combustion are thrown further forward from the combustion space toward the front of the chamber A, and any tendency for in-draft of cold air around the opening 7 and outlet 5 will be neutralized. By raising the stack damper 11, the draft is increased so that the products of combustion do not move so far forward from the combustion space before they turn rearwardly and pass along the under face of the baffle 13. If the stack damper 11 is raised far enough, there will be an in-draft of cold air around the opening 7. Therefore, the stack damper can be set to control the path of the flame, gases, or products of combustion and maintain a balanced draft or quiescent condition about the opening 7 and outlet 5, as conditions may require.

As above described, the heat produced by the burner in the combustion space may be controlled and its application to the walls of the chamber A may also be controlled by lengthening or shortening the flame. Shortening the flame tends to heat the baffle and walls of the chamber A adjacent the forehearth 2 more than the walls of the said chamber at and below the outlet; while lengthening the flame increases the temperature of the chamber walls at and under the outlet which thus radiate more heat into the enclosing chamber around and under the outlet than to the glass in the forehearth. Local temperature conditions at and below the outlet and in the forehearth may therefore be separately controlled.

To maintain the desired condition of atmosphere in the chamber surrounding the outlet, for every setting of the burner valves and air gate, there should be a relative setting of the stack damper. In this way, both the temperature of the glass in the forehearth and the temperature and draft conditions in the chamber enclosing the outlet are under control and may be regulated at will, thus securing the proper conditioning of the glass before and during its delivery.

By preference, a suitable gather forming and controlling device 22, for example; a paddle, plunger, or other gather forming instrumentality, is utilized to govern and control the discharge of glass from the outlet 5. This device is so operated that uniform gathers of glass are periodically discharged from and suspended beneath the outlet. After the formation of the gather, shear blades 23 operating in timed relation to the gather forming and controlling device, enter the chamber A through the apertures 24 and sever the suspended gathers into mold charges, after which the stub or cut end of the remainder of the glass adjacent the outlet may be raised by the gather forming and controlling device, and incorporated into the glass which forms the succeeding gather. One type of mechanism which may be utilized for operating the gather controlling device and shears is illustrated in the co-pending application of Karl E. Peiler, filed March 28, 1917, Serial Number 157,943.

Throughout the formative period of the gather at and under the outlet, whether before or after the severing operation, radiant heat is imparted to the gather from the walls of the chamber A which reheats or remelts any chilled portion of the gather or glass at and under the outlet, thereby producing a gather of uniform temperature and plasticity, free from blisters foreign matter and chill marks. Thus the entire surface of the oncoming gather or stream of glass as the case may be, is heated or prevented from cooling as it emerges from the container.

To rapidly heat the outlet 5, and glass adjacent thereto, when starting operations, an adjustable burner 25, firing through an auxiliary combustion chamber 26, may be provided. The shape and location of the chamber is such that the flames or products of combustion play upon the outlet 5 and glass adjacent thereto, heating them so that the glass will readily be discharged. After the outlet and glass have been sufficiently heated to insure the discharge of the glass, the burner 25 is shut off and the chamber 26 is closed by a gate or block 27. Subsequent continued heating of the outlet and glass adjacent thereto during the normal operation of this device is thereafter effected by heat radiated and reflected from the walls of the chamber, as hereinbefore described.

To maintain a balanced draft condition and to prevent escape of heat from the chamber A, where of necessity any openings are made therein suitable adjustable air jets 28 may be positioned so as to play upon the openings.

For the purpose of observation, an opening or openings 30 may be formed in the walls of the chamber. This opening is normally closed by a plug 31 to prevent the escape of heat from the chamber.

After the mold charges have been severed, they may fall directly into molds or be removed from beneath the outlet by a chute 32 or other suitable device and delivered to mechanism for further treatment.

We claim for our invention:

1. In a glass conditioning apparatus, the combination with a reservoir for molten glass, of a chamber adjacent thereto, a passage for glass connecting the said reservoir and chamber, means for introducing heat into the chamber independently of the heat in the reservoir, and means for governing the local distribution of the heat within the chamber.

2. In a glass conditioning apparatus, the combination with a reservoir for molten glass, of a chamber adjacent thereto, a passage for glass connecting the said reservoir and chamber, means for heating the walls of the chamber independently of the heat in the reservoir, and means for governing the local distribution of heat to the walls of the chamber.

3. In a glass conditioning apparatus, the combination with a reservoir for molten glass, of a glass container adjacent thereto provided with an outlet, a hood surrounding said container and outlet, means for locally heating the walls of the hood adjacent the container, and means for governing the local distribution of said heating.

4. In a glass conditioning apparatus, the combination with a reservoir for molten glass, of a glass container adjacent thereto provided with an outlet, a hood surrounding the said container and outlet, means for locally heating the walls of the hood adjacent the outlet and means for governing the local distribution of said heating.

5. Apparatus for conditioning molten glass including a chamber for the glass, means for applying radiant heat to the glass in said chamber, and means independent of the heating means for controlling the local distribution of the said radiant heat.

6. The combination of a container for molten glass, a combustion space above the said container and communicating therewith at its forward end, means for introducing hot gases into the combustion space and means for controlling and directing the gases from the combustion space into the container and above the level of the glass therein.

7. Glass conditioning apparatus, including a container for molten glass, a firing space, a baffle between said container and said space for directing heated gases over the surface of the glass in said container, a stack in communication with the container, and means operable in conjunction with the stack for controlling the admission of gases from the firing space into the container.

VERGIL MULHOLLAND.
KARL E. PEILER.